United States Patent
Wang et al.

(10) Patent No.: US 8,298,623 B2
(45) Date of Patent: Oct. 30, 2012

(54) METHOD FOR MAKING COMPOSITE MATERIAL

(75) Inventors: Jia-Ping Wang, Beijing (CN); Kai-Li Jiang, Beijing (CN); Qun-Qing Li, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 253 days.

(21) Appl. No.: 12/592,497

(22) Filed: Nov. 25, 2009

(65) Prior Publication Data

US 2010/0239850 A1    Sep. 23, 2010

Related U.S. Application Data

(63) Continuation of application No. 12/589,470, filed on Oct. 23, 2009.

(30) Foreign Application Priority Data

Mar. 21, 2009   (CN) .......................... 2009 1 0106339

(51) Int. Cl.
   *B05D 3/04*   (2006.01)
(52) U.S. Cl. ..................... 427/554; 427/215; 427/249.1; 427/427
(58) Field of Classification Search .............. 427/249.1, 427/180, 201, 554, 215, 427; 204/192.1
See application file for complete search history.

(56) References Cited

U.S. PATENT DOCUMENTS

| | | | |
|---|---|---|---|
| 6,312,131 B1 * | 11/2001 | Yamamoto et al. | 359/507 |
| 6,911,260 B2 * | 6/2005 | Ren et al. | 428/408 |
| 7,045,108 B2 | 5/2006 | Jiang et al. | |
| 7,799,726 B2 * | 9/2010 | Pham-Huu et al. | 502/180 |
| 2004/0239861 A1 * | 12/2004 | Uchida | 349/149 |
| 2005/0239948 A1 * | 10/2005 | Haik et al. | 524/496 |
| 2007/0114138 A1 * | 5/2007 | Krasteva et al. | 205/787 |
| 2007/0161213 A1 | 7/2007 | Hiura et al. | |
| 2007/0166223 A1 | 7/2007 | Jiang et al. | |
| 2008/0160856 A1 * | 7/2008 | Chen et al. | 442/341 |

(Continued)

FOREIGN PATENT DOCUMENTS

CN        1803586 A       7/2006

(Continued)

OTHER PUBLICATIONS

Suenaga, K., et al., "Synthesis of Nanoparticles and Nanotubes with Well-Separated Layers of Boron Nitride and Carbon." Science, vol. 278, Oct. 24, 1997, pp. 653-655.*

(Continued)

*Primary Examiner* — Bret Chen
(74) *Attorney, Agent, or Firm* — Altis Law Group, Inc.

(57) ABSTRACT

A method for fabricating a composite material includes providing a free-standing carbon nanotube structure having a plurality of carbon nanotubes, introducing at least two reacting materials into the carbon nanotube structure to form a reacting layer, activating the reacting materials to grow a plurality of nanoparticles, wherein the nanoparticles are spaced from each other and coated on a surface of each of the carbon nanotubes of the carbon nanotube structure.

20 Claims, 14 Drawing Sheets

```
providing a free-standing CNT structure
              |
              v
introducing at least two reacting materials
              |
              v
activating the reacting materials to grow
a CNT composite material
```

U.S. PATENT DOCUMENTS

| | | | |
|---|---|---|---|
| 2008/0170982 A1 | 7/2008 | Zhang et al. | |
| 2008/0299031 A1 | 12/2008 | Liu et al. | |
| 2009/0075157 A1 | 3/2009 | Pak et al. | |
| 2009/0075171 A1 | 3/2009 | Feng et al. | |
| 2010/0068461 A1* | 3/2010 | Wallace et al. | 428/156 |
| 2010/0104808 A1* | 4/2010 | Fan et al. | 428/143 |
| 2010/0255290 A1* | 10/2010 | Bai et al. | 428/327 |
| 2011/0027162 A1* | 2/2011 | Steiner et al. | 423/440 |
| 2011/0186775 A1* | 8/2011 | Shah et al. | 252/182.32 |
| 2012/0070667 A1* | 3/2012 | Malet et al. | 428/408 |

FOREIGN PATENT DOCUMENTS

| | | |
|---|---|---|
| CN | 1304280 C | 3/2007 |
| CN | 101255590 | 9/2008 |
| CN | 101255591 A | 9/2008 |
| CN | 101259960 | 9/2008 |
| CN | 101311306 | 11/2008 |
| CN | 101388447 | 3/2009 |
| JP | 200459409 | 2/2004 |
| JP | 2007123657 | 5/2007 |
| TW | 200702479 | 1/2007 |
| TW | 200724486 | 7/2007 |
| WO | WO 2005/075663 * | 8/2005 |

OTHER PUBLICATIONS

Hongtao, Yu, et al., "Preparation and characterization of aligned carbon nanotubes coated with titania nanoparticles". Chinese Science Bulletin 2006, vol. 51, No. 18, 2294-2296.*

Huang, Jia-Qi, et al., "The release of free standing vertically-aligned carbon nanotube arrays from a substrate using $CO_2$ oxidation". Carbon 48 (2010) pp. 1441-1450.*

Zou, G.F., et al., "Highly aligned carbon nanotube forests coated by superconducting NbC". Nature Communications DOI: 10.1038/ncomms1438 pp. 1-5.*

"Fabrication of Titania Nanofibers by Electrospinning", Dan Li et al., Nano Letters, vol. 3, No. 4 pp. 555-560 (2003).

A.Gomathi et al."Chemically Bonded Ceramic Oxide Coatings on Carbon Nanotubes and Inorganic Nanowires", Advanced Materials, vol. 17, 2005, pp. 2757-2761.

H.Jiang et al."The preparation of stable metal nanoparticles on carbon nanotubes whose surfaces were modified during production", Carbon, vol. 45, 2007, pp. 655-661.

Dominik Eder et al."Morphology control of CNT-$TiO_2$ hybrid materials and rutile nanotubes", J.Mater. Chem., vol. 18, 2008, pp. 2036-2043.

* cited by examiner

METHOD FOR MAKING COMPOSITE MATERIAL

RELATED APPLICATIONS

This application is a continuation of U.S. patent application Ser. No. 12/589,470, filed on 2009 Oct. 23, entitled, "COMPOSITE MATERIAL." This application claims all benefits accruing under 35 U.S.C. §119 from China Patent Application No. 200910106339.9, filed on Mar. 21, 2009 in the China Intellectual Property Office. This application is related to applications entitled "NANO-MATERIALS" with the same assignee, and a copending U.S. patent application Ser. No. 12/589,493, filed on 2009 Oct. 23; "METHOD FOR MAKING NANOWIRE STRUCTURE" with the same assignee, and a copending U.S. patent application Ser. No. 12/589,469, filed 2009 Oct. 23; "CARBON NANOTUBE COMPOSITE AND METHOD FOR FABRICATING THE SAME" with the same assignee, and a copending U.S. patent application Ser. No. 12/583,155, filed 2009 Oct. 23, filed on 2009 Aug. 13.

BACKGROUND

1. Technical Field

The disclosure relates to a composite material, and particularly to a carbon nanotube composite material.

2. Description of Related Art

Many novel properties are beyond traditional theories when the materials are nano-sized, which may reasonably make nano-materials the representative of modern science and technology. The potential research is highly sought because of their distinct catalytic, electronic, magnetic, and luminescent properties. A composite material having carbon nanotubes as reinforcement and as an electrical conductor as well as nano-particles have broad applications in the field of microelectronics, material science, biology, and chemistry because of good anti-static performance, microwave absorbing capability, electromagnetic shielding ability, and so on. However, the nano-particles are prone to agglomerate together. Methods have been developed to manufacture a composite which includes a plurality of carbon nanotubes with nano-particles uniformly distributed on the surface of the carbon nanotubes.

A carbon nanotube composite material includes a plurality of carbon nanotube powders and tricobalt tetraoxide ($Co_3O_4$) particles coated on the surface of the carbon nanotube powders. The carbon nanotubes and $Co_3O_4$ particles form a composite nano-powder. A typical method for making the composite nano-powder includes:

(a1) putting the carbon nanotube powders into a strong nitric acid for about 6 to about 8 hours;
(a2) introducing active functional group, for example, hydroxyl group or carboxyl group on the surface of the carbon nanotube powder;
(a3) using deionized water to clean the carbon nanotube powders which is activated by active functional group;
(a4) providing a mixture which is made by dissolving a cobalt (II) nitrate hexahydrate into an ethanol solution;
(a5) immersing the carbon nanotube powders into the mixture and vibrating by ultrasound for about 15 to about 60 minutes, so that the cobalt(II) nitrate hexahydrate are adsorbed on the surface of the carbon nanotube powders;
(a6) pouring the mixture into a silicone oil for about 5 to 10 hours to decompose the cobalt(II) nitrate hexahydrate into $Co_3O_4$ particles to obtain the carbon nanotube composite material coated by $Co_3O_4$ particles; and
(a7) cleaning the carbon nanotube composite material by ethane and ethanol.

However, the above mentioned method is complicated, costly, and not suitable for mass production. Furthermore, strong nitric acid can be prone to pollute the environment.

A composite film material includes a carbon nanotube film on a metal substrate and nickel (Ni) nano-particles. The nickel (Ni) nano-particles are deposited on the carbon nanotube film. A method for making the carbon nanotube composite film material includes:

(b1) providing a metal substrate and a plurality of carbon nanotubes;
(b2) polishing and degreasing the metal substrate;
(b3) putting the carbon nanotubes into an acetylacetone solution and ultrasonically vibrating the solution to obtain a carbon nanotube suspension;
(b4) using the metal substrate as a cathode and supplying a direct current into the suspension to deposit the carbon nanotubes on the surface of the metal substrate and forming a carbon nanotube film on the metal substrate; and
(b5) placing the metal substrate on a carbon nanotube film deposited into a plating solution with Ni, and coating Ni nano-particles on the surface of the carbon nanotube film by electroplating to obtain the composite film material.

However, in this method, the Ni particles are prone to agglomerate together. Furthermore, the method is complicated, costly, and not suitable for mass production.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

Carbon Nanotube Composite Material

Figure 1:
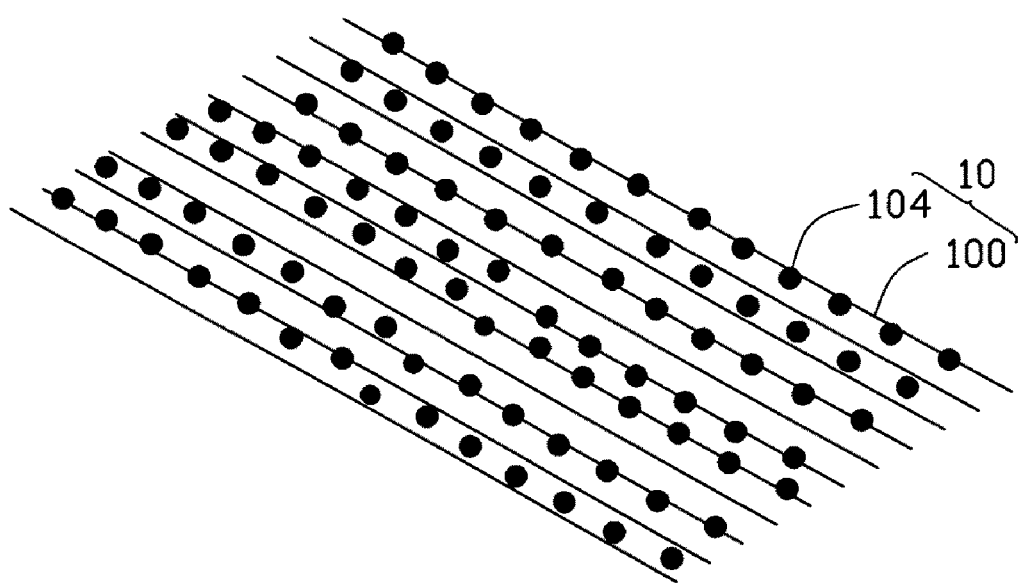
FIG. 1 is a schematic view of one embodiment of a composite material.

Referring to FIG. 1, a carbon nanotube composite material 10 includes a carbon nanotube structure 100 and a plurality of nanoparticles 104. The carbon nanotube structure 100 includes a plurality of carbon nanotubes adhered to each other and together by van der Waals attractive forces to form a free-standing structure. The carbon nanotube structure 100 can be a carbon nanotube film structure or a carbon nanotube wire structure. The nanoparticles 104 are uniformly distributed in the carbon nanotube structure 100.

The free-standing carbon nanotube structure means the carbon nanotube structure can maintain a certain shape without any supporter, which is different from a powder or liquid form. Since the carbon nanotube structure includes the plurality of carbon nanotubes combined by Van der Waals attractive force therebetween, the certain shape is formed. The carbon nanotube structure is made only of carbon nanotubes. The carbon nanotubes can be orderly or disorderly arranged. The carbon nanotubes in the carbon nanotube structure can be single-walled, double-walled, or multi-walled carbon nanotubes. A diameter of each single-walled carbon nanotube ranges from about 0.5 nanometers (nm) to about 50 nm. A diameter of each double-walled carbon nanotube ranges from about 1 nm to about 50 nm. A diameter of each multi-walled carbon nanotube ranges from about 1.5 nm to about 50 nm. The length of each carbon nanotube is above 50 micrometers (μm). In one embodiment, the length of the carbon nanotubes ranges from about 200 μm to 900 μm.

The carbon nanotube structure can be a carbon nanotube film structure with a thickness ranging from about 0.5 nm to about 1 millimeter (mm). The carbon nanotube film structure can include at least one carbon nanotube film. The carbon nanotube structure can also be a linear carbon nanotube structure with a diameter ranging from about 0.5 nm to about 1 mm. The carbon nanotube structure can also be a combination of the carbon nanotube film structure and the linear carbon nanotube structure. It is understood that any carbon nanotube structure described can be used with all embodiments.

Drawn Carbon Nanotube Film

Figure 2:
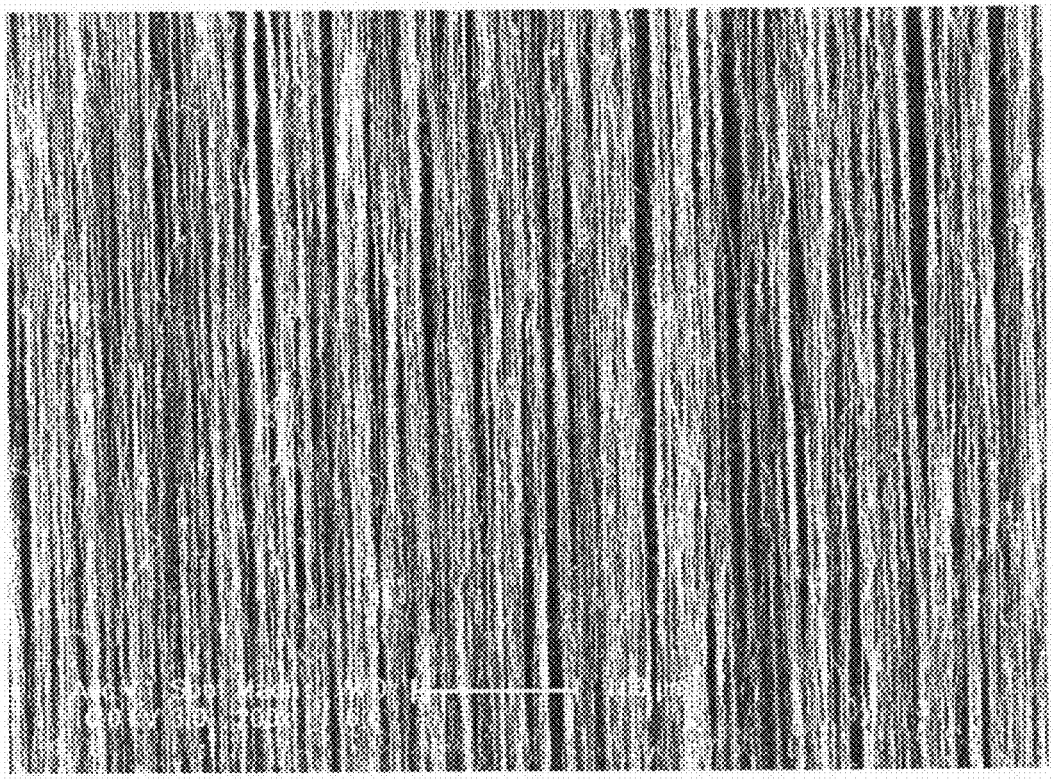
FIG. 2 shows a Scanning Electron Microscope (SEM) image of a drawn carbon nanotube film.
Figure 3:
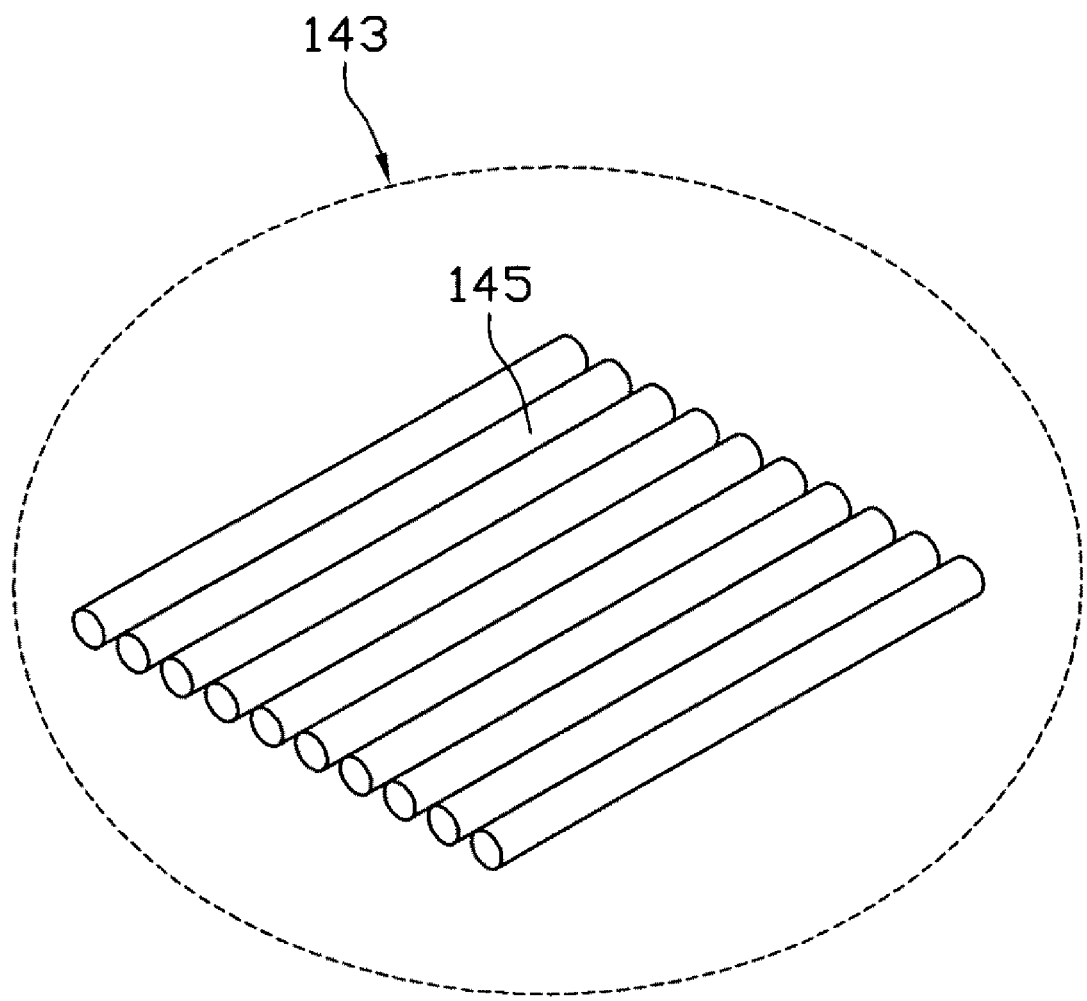
FIG. 3 is a schematic structural view of a carbon nanotube segment of the drawn carbon nanotube film of FIG. 2.

In one embodiment, the carbon nanotube film structure includes at least one drawn carbon nanotube film. A film can be drawn from a carbon nanotube array, to form a drawn carbon nanotube film. Examples of drawn carbon nanotube film are taught by U.S. Pat. No. 7,045,108 to Jiang et al., and WO 2007015710 to Zhang et al. The drawn carbon nanotube film includes a plurality of successive and oriented carbon nanotubes joined end-to-end by van der Waals attractive force therebetween. The drawn carbon nanotube film is a free-standing film. Referring to FIGS. 2 to 3, each drawn carbon nanotube film includes a plurality of successively oriented carbon nanotube segments 143 joined end-to-end by van der Waals attractive force therebetween. Each carbon nanotube segment 143 includes a plurality of carbon nanotubes 145 substantially parallel to each other, and combined by van der Waals attractive force therebetween. The carbon nanotubes 145 in the drawn carbon nanotube film are substantially oriented along a preferred orientation. The carbon nanotube film can be treated with an organic solvent to increase the mechanical strength and toughness of the carbon nanotube film and reduce the coefficient of friction of the carbon nanotube film. A thickness of the carbon nanotube film can range from about 0.5 nm to about 100 μm.

A method of making a drawn carbon nanotube film includes the steps of:

providing an array of carbon nanotubes; and pulling out a drawn carbon nanotube film from the array of carbon nanotubes. Pulling can be aided by the use of a tool such as adhesive tape, pliers, tweezers, or other tools allowing multiple carbon nanotubes to be gripped and pulled simultaneously.

The drawn carbon nanotube film can be formed by selecting one or more carbon nanotubes having a predetermined width from the array of carbon nanotubes and pulling the carbon nanotubes at a uniform speed to form carbon nanotube segments that are joined end to end to achieve a uniform drawn carbon nanotube film.

The carbon nanotube segments can be selected by using the tool allowing multiple carbon nanotubes to be gripped and pulled simultaneously to contact with the array of carbon nanotubes. The pulling direction can be substantially perpendicular to the growing direction of the array of carbon nanotubes.

More specifically, during the pulling process, as the initial carbon nanotube segments are drawn out, other carbon nanotube segments are also drawn out end to end due to van der Waals attractive forces between ends of adjacent segments. This process of pulling produces a substantially continuous and uniform carbon nanotube film having a predetermined width.

The carbon nanotube film structure can include at least two stacked carbon nanotube films. In other embodiments, the carbon nanotube structure can include two or more coplanar carbon nanotube films, and can include layers of coplanar carbon nanotube films. Additionally, when the carbon nanotubes in the carbon nanotube film are substantially aligned along one preferred orientation (e.g., the drawn carbon nanotube film), an angle can exist between the orientation of carbon nanotubes in adjacent films, whether they are stacked or adjacent. Adjacent carbon nanotube films can be combined only by the van der Waals attractive force therebetween. The number of the layers of the carbon nanotube films is not limited. However, as the thickness of the carbon nanotube structure increases, the specific surface area decreases. An angle between the aligned directions of the carbon nanotubes in two adjacent carbon nanotube films can range from about 0 degrees to about 90 degrees. When the angle between the aligned directions of the carbon nanotubes in adjacent carbon nanotube films is larger than 0 degrees, a microporous structure is defined by the carbon nanotubes. The carbon nanotube structure in an embodiment employing these films will have a plurality of micropores. The micropore has a diameter which can range from about 1 nm to about 0.5 μm. Stacking the carbon nanotube films will also add to the structural integrity of the carbon nanotube structure.

Pressed Carbon Nanotube Film

Figure 4:
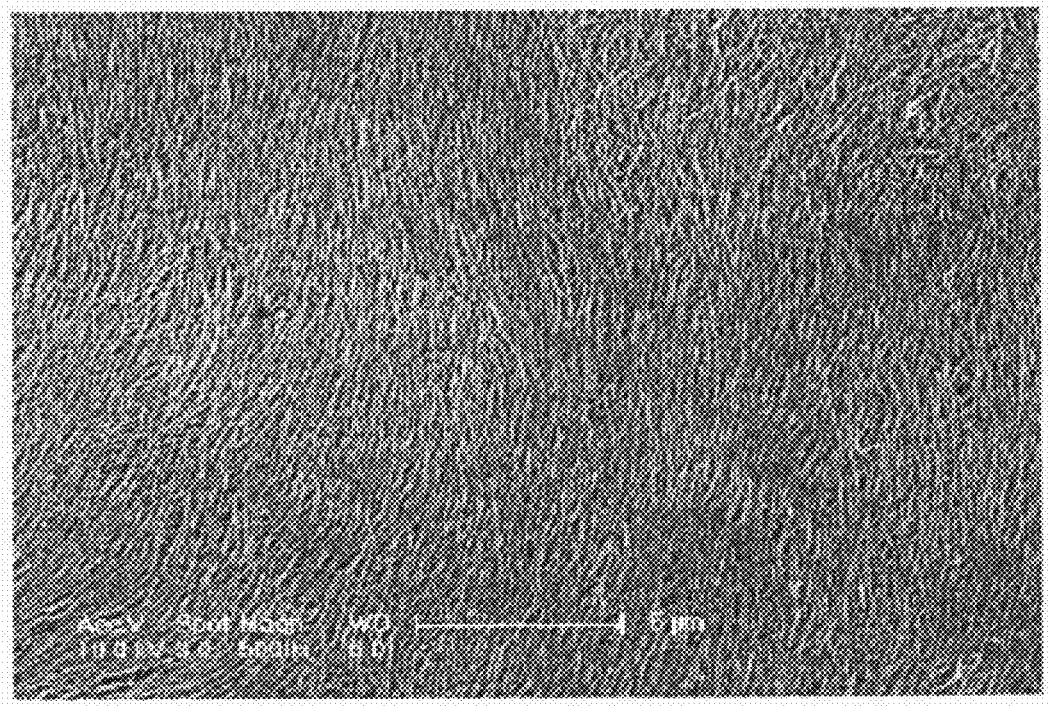
FIG. 4 is an SEM image of a pressed carbon nanotube film of carbon nanotube structure, wherein carbon nanotubes of the pressed carbon nanotube film are arranged along a same direction.
Figure 5:
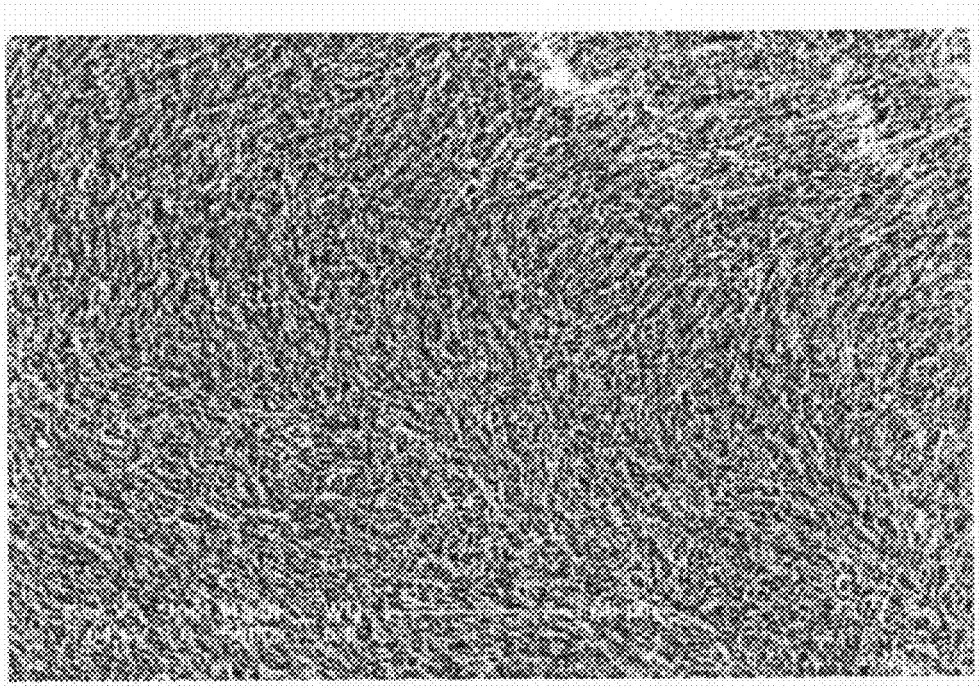
FIG. 5 is an SEM image of a pressed carbon nanotube film, wherein carbon nanotubes of the pressed carbon nanotube film are arranged along different directions.

In another embodiment, the carbon nanotube film structure can include at least one pressed carbon nanotube film. Referring to FIGS. 4 and 5, the pressed carbon nanotube film can be a free-standing carbon nanotube film. The carbon nanotubes in the pressed carbon nanotube film can be substantially arranged along a same direction (see FIG. 4) or substantially arranged along different directions (see FIG. 5). The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to about 15 degrees. The greater the pressure applied, the smaller the angle formed. When the carbon nanotubes in the pressed carbon nanotube film are substantially arranged along different directions, the carbon nanotube structure can be isotropic. The thickness of the pressed carbon nanotube film ranges from about 0.5 nm to about 1 mm. Examples of pressed carbon nanotube film are taught by US application 20080299031A1 to Liu et al.

The pressed carbon nanotube film can be executed by providing an array of carbon nanotubes formed on a substrate; and providing a pressing device to press the array of carbon nanotubes, thereby forming the pressed carbon nanotube film.

Flocculated Carbon Nanotube Film

Figure 6:
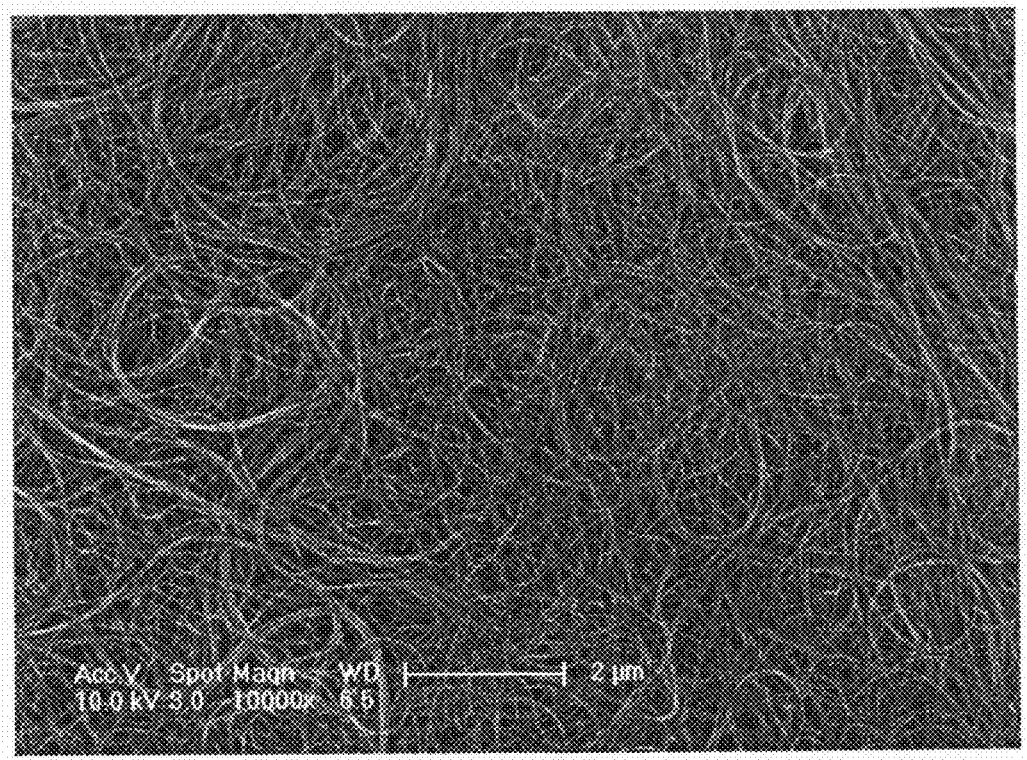
FIG. 6 is an SEM image of a flocculated carbon nanotube film with carbon nanotubes entangled with each other therein.

In another embodiment, the carbon nanotube film structure includes a flocculated carbon nanotube film. Referring to FIG. 6, the flocculated carbon nanotube film can include a plurality of long, curved, disordered carbon nanotubes entangled with each other. Further, the flocculated carbon nanotube film can be isotropic. The carbon nanotubes can be substantially uniformly dispersed in the carbon nanotube film. Adjacent carbon nanotubes are acted upon by van der Waals attractive force to form an entangled structure with micropores defined therein. It is understood that the flocculated carbon nanotube film is very porous. Sizes of the micropores can be less than 10 μm. The porous nature of the flocculated carbon nanotube film will increase the specific surface area of the carbon nanotube structure. Further, due to the carbon nanotubes in the carbon nanotube structure being entangled with each other, the carbon nanotube structure employing the flocculated carbon nanotube film has excellent durability, and can be fashioned into desired shapes with a low risk to the integrity of the carbon nanotube structure.

The flocculated carbon nanotube film can be executed by providing carbon nanotubes, flocculating the carbon nanotubes in a solvent to acquire a carbon nanotube flocculated structure, separating the carbon nanotube flocculated structure from the solvent, and shaping the separated carbon nanotube flocculated structure into the flocculated carbon nanotube film in which the carbon nanotubes are entangled with each other and isotropic.

Linear Carbon Nanotube Structure

In other embodiments, the linear carbon nanotube structure includes carbon nanotube wires and/or carbon nanotube cables.

Figure 7:
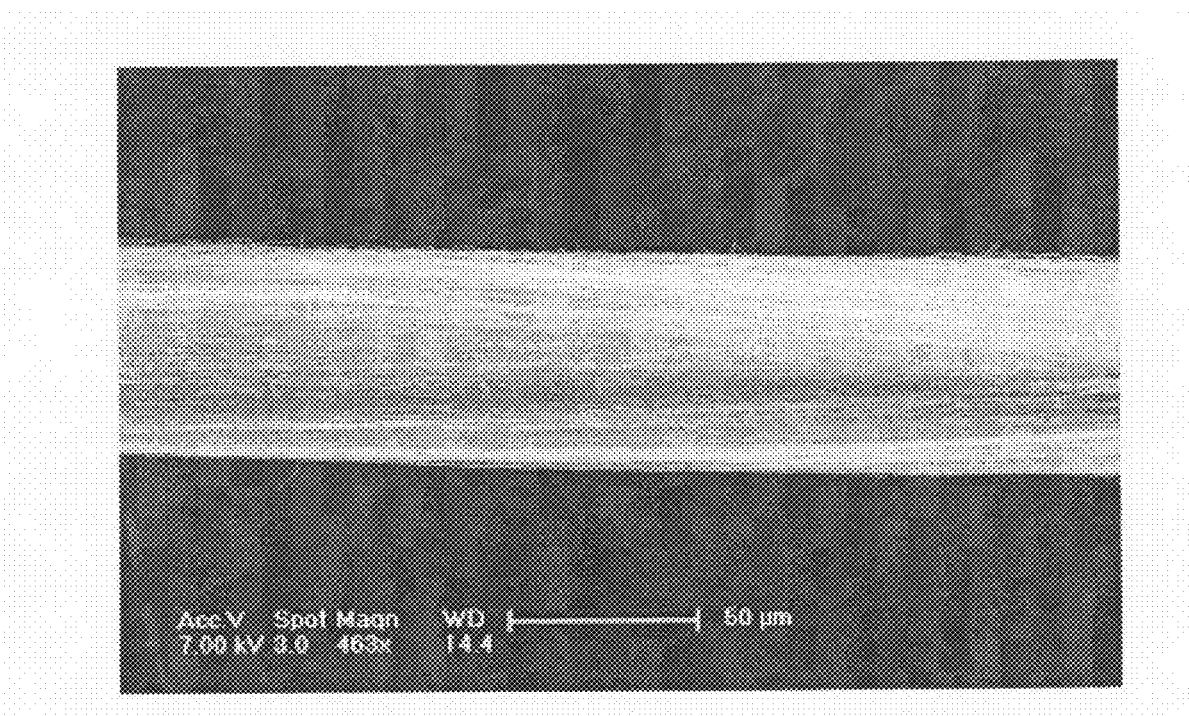
FIG. 7 is an SEM image of an untwisted carbon nanotube wire.

The carbon nanotube wire can be untwisted or twisted. Treating the drawn carbon nanotube film with a volatile organic solvent can form the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be shrunk into untwisted carbon nanotube wire. Referring to FIG. 7, the untwisted carbon nanotube wire includes a plurality of carbon nanotubes substantially oriented along a same direction (i.e., a direction along the length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity, and shape. Length of the untwisted carbon nanotube wire can be arbitrarily set as desired. A diameter of the untwisted carbon nanotube wire ranges from about 0.5 nm to about 100 μm.

Figure 8:
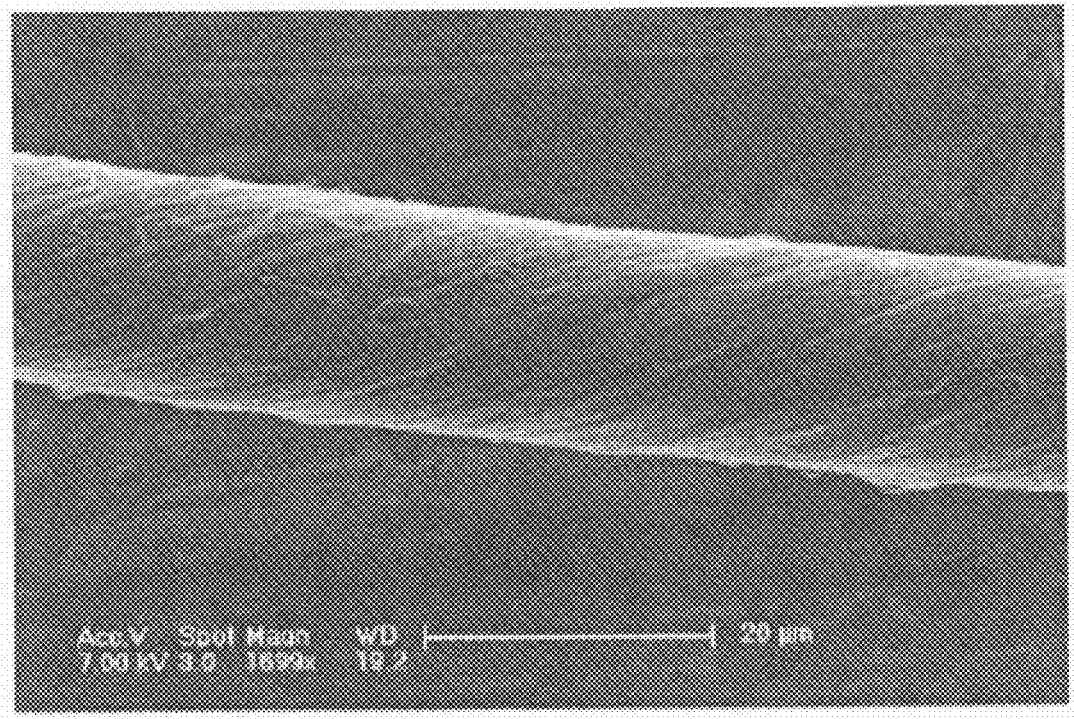
FIG. 8 is an SEM image of a twisted carbon nanotube wire.

The twisted carbon nanotube wire can be formed by twisting a drawn carbon nanotube film using a mechanical force to turn the two ends of the drawn carbon nanotube film in opposite directions. Referring to FIG. 8, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The length of the carbon nanotube wire can be set as desired. A diameter of the twisted carbon nanotube wire can be from about 0.5 nm to about 100 μm. Further, the twisted carbon nanotube wire can be treated with a volatile organic solvent after being twisted. After being soaked by the organic solvent, the adjacent carbon nanotubes in the twisted carbon nanotube wire will bundle together, due to the surface tension of the organic solvent when the organic solvent volatilizes. The specific surface area of the twisted carbon nanotube wire will decrease, while the density and strength of the twisted carbon nanotube wire will increase.

The carbon nanotube cable includes two or more carbon nanotube wires. The carbon nanotube wires in the carbon nanotube cable can be twisted or untwisted. In an untwisted carbon nanotube cable, the carbon nanotube wires are substantially parallel with each other. In a twisted carbon nanotube cable, the carbon nanotube wires are twisted with each other.

The carbon nanotube structure can be adhered to a supporter, such as a frame or a substrate.

The nanoparticles 104 are spaced from each other and coated on the surface of each of the carbon nantoubes of the carbon nanotube structure 100. The distances between two adjacent nanoparticles 104 are larger than the diameters of each nanoparticle 104. The diameter of each of the nanoparticles 104 is in a range from about 1 nm to about 100 nm. In one embodiment, the diameter of the nanoparticle is in a range from about 1 nm to about 50 nm. Each nanoparticle 104 wraps part surface of at least one carbon nanotube. When the size of the carbon nanotube is smaller than that of the nanoparticle 104, the whole carbon nanotube is totally wrapped by the nanoparticle 104. The carbon nanotubes also can be bundled together to form a plurality of carbon nanotube bundles. The nanoparticles 104 are spacedly coated on the surface of the carbon nanotube bundle and arranged along the length direction of the carbon nanotube bundle.

The nanoparticles 104 and the carbon nanotube are attracted by chemical bond and van Der Waals attractive force. The carbon nanotube composite material 10 has a large specific surface because the carbon nanotubes have gaps therebetween and the nanoparticles 104 are spacedly arranged among the carbon nantoubes of the carbon nanotube structure. The carbon nanotubes are isotropic, long, curved, disordered, and entangled with each other.

The nanoparticles 104 can be metal nanoparticles, non-metal nanoparticles, alloy nanoparticles, metallic oxide nanoparticles, polymer nanoparticles, and any combination thereof. The metallic oxide nanoparticles include titanium dioxide ($TiO_2$), zinc oxide (ZnO), nickel oxide (NiO), aluminum oxide (AlO), and any combination thereof. In one embodiment, the nanoparticle 104 is $TiO_2$. The shape of the nanoparticles 104 can be a sphere, a spheroid, and any combination thereof In one embodiment, the carbon nanotube structure 100 includes a plurality of the carbon nanotube wires. The carbon nanotube wires can be substantially parallel to each other, or have a discernable angle between the two adjacent carbon nanotube wires to form a carbon nanotube film. At least one carbon nanotube of the carbon nanotube wire is embedded in one nanoparticle 104. In one embodiment, the diameters of the nanoparticles 104 are in a range from about 80 nm to about 120 nm.

The carbon nanotube composite material 10 in the present embodiment has many advantages. Firstly, the carbon nanotube composite material 10 has a large specific surface because the carbon nanotubes have gaps therebetween and the nanoparticles 104 are spaced among the carbon nantoubes of the carbon nanotube structure. The carbon nanotube composite material 10 which has a lager specific surface can be used as a good catalyst. Secondly, the nanoparticles 104 are uniformly distributed on the carbon nanotube structure 100 to prevent the nanoparticles 104 from agglomerating. In addition, the carbon nanotube composite material 10 is a free-standing structure because the carbon nanotube structure 100 is a free-standing structure.

Method for Carbon Nanotube Composite Material

Figure 9:
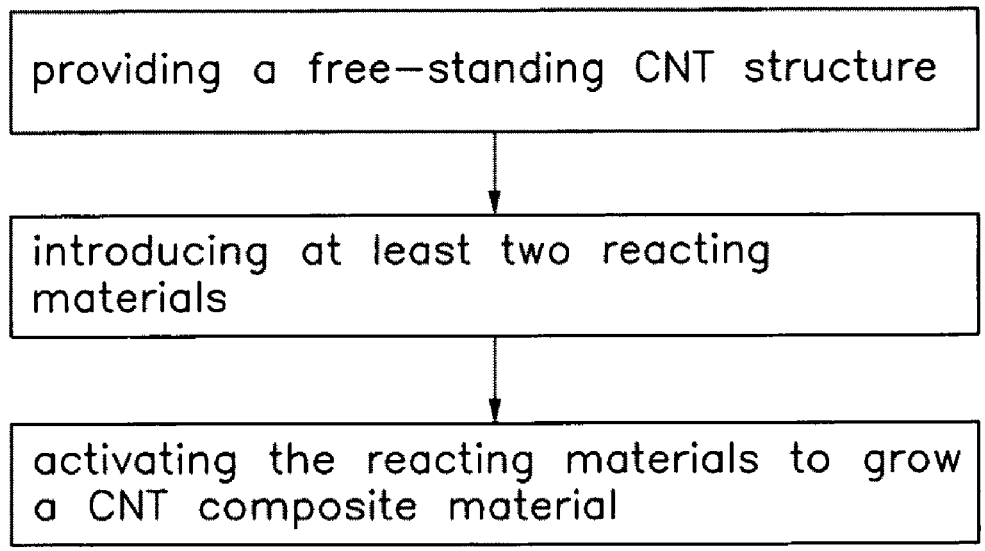
FIG. 9 is a flow chart of one embodiment of a method for fabricating a composite material.
Figure 10:
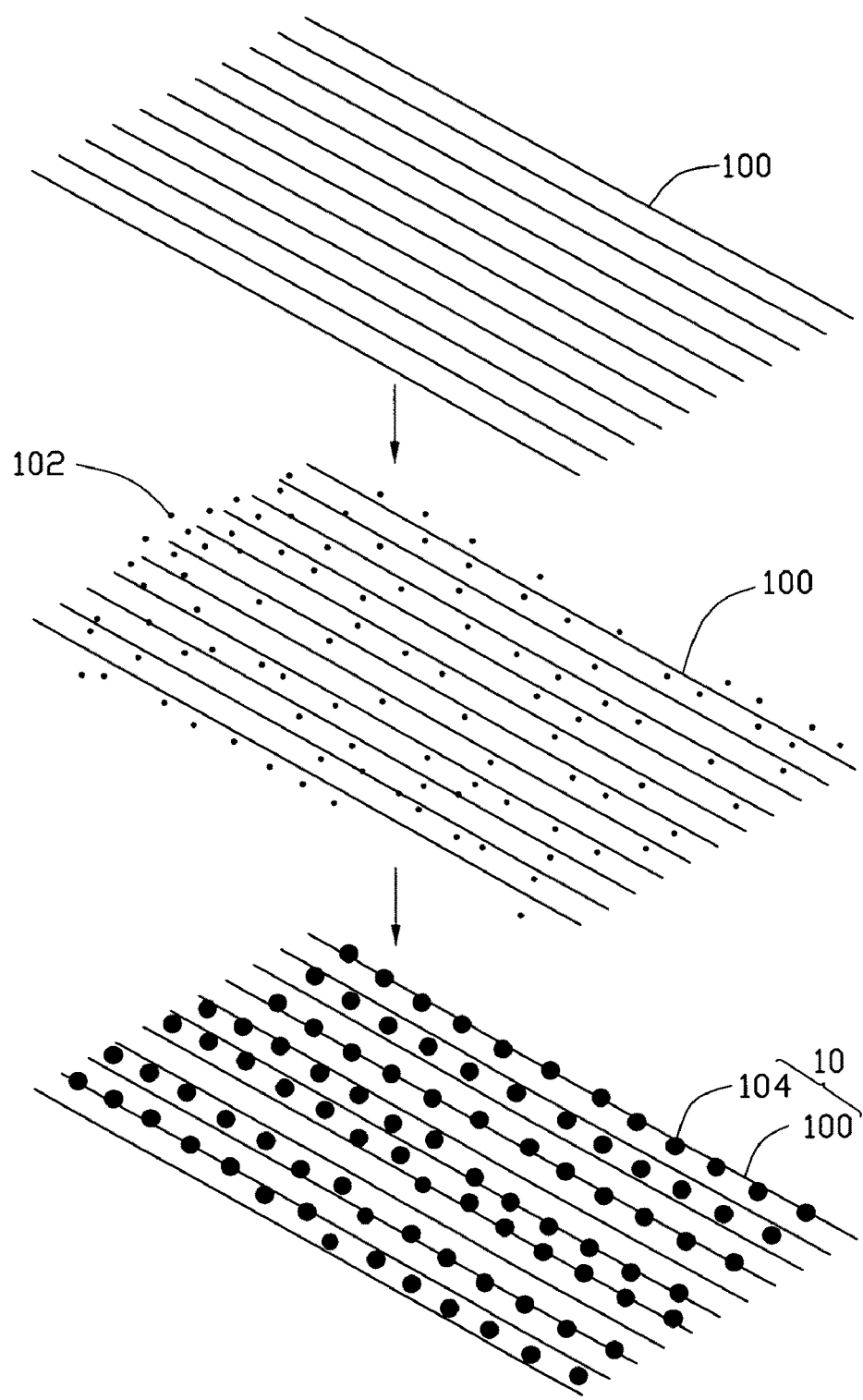
FIG. 10 is a schematic flow chart of the method for fabricating the composite material of FIG. 9.

Referring to FIGS. 9 and 10, one embodiment of a method for making the carbon nanotube composite material 10 includes:

(1) providing a free-standing carbon nanotube structure 100;

(2) introducing at least two types of reacting materials into the carbon nanotube structure; and (3) activating the reacting materials to grow a nanowire structure.

Method For Step 1

In step (1), the carbon nanotube structure 100 includes a plurality of carbon nanotubes adhered to each other by the van Der Waals attractive force to form a free-standing structure. The carbon nanotube structure 100 includes one or more carbon nanotube films or one or more carbon nanotube wires. The carbon nanotube film structure can be a grown carbon nanotube film, a flocculated carbon nanotube film, a pressed carbon nanotube film, or a drawn carbon nanotube film.

The carbon nanotube films can be adhered to a frame or on a substrate directly. In one embodiment, two carbon nanotube films can be stacked side by side substantially parallel to each other on a metal frame to form the carbon nanotube structure 100.

Method For Step 2

In step (2), the reacting materials can be solid, liquid, or gaseous.

One method for introducing the at least two types of reacting materials into the carbon nanotube structure includes (2a1) introducing a first reacting material to form a first reacting material layer on the surface of the carbon nanotube structure, and (2a2) introducing a second reacting material to the carbon nanotube structure.

In step (2a1), the thickness of the first reacting material layer is about 1 nm to about 100 nm. The material of the first reacting material is dependent on the material of the nanoparticle 104 to be prepared. The first reacting material can be a metal, non-metal, semiconductor, and any combination thereof as desired. In one embodiment, the first reacting material is metal, for example, titanium (Ti), aluminum (Al), or nickel (Ni), and metal compound nanoparticles, for example, metal oxide or metal silicides. The nanoparticle 104 structure can be obtained by introducing the first reacting material. In one embodiment, the first reacting material is silicon and a non-metal compound, for example, silicon nitride or silicon carbide nanostructure can be obtained by introducing the first reacting material.

The method for forming the first reacting layer can be chemical vapor deposition (CVD), physical vapor deposition (PVD), impregnation method, spraying method, or silk-screen printing method. The metal or metal oxide can be sputtered on the surface of the carbon nanotube structure by the PVD method. The non-metallic nitride or carbide can be formed on the surface of the carbon nanotube structure by the CVD method. The metal organic solution can be formed on the surface of the carbon nanotube structure by the methods of impregnation, spraying, or silk-screen printing. Part or all the surface of the carbon nanotube structure can be coated with the first reacting materials.

In step (2a2), the second reacting material can be liquid or gaseous. The gaseous second reacting material can be oxygen gas, nitrogen gas, silicon source gas and carbon source gas, and any combination thereof. The method of introducing the gaseous second reacting material is directly introducing the gaseous second reacting material into a chamber having a carbon nanotube structure deposited thereon. The gaseous second reacting material is distributed on the surroundings of the carbon nanotube structure and the first reacting material.

The second reacting material can also be in liquid form such as methanol, ethanol, acetone, liquid resin, and any combination thereof. The method of introducing the liquid second reacting material is by directly dropping the liquid second reacting material on the surface of the carbon nanotube structure or immersing the carbon nanotube structure in the liquid reacting material. The liquid second reacting material is distributed on the surroundings of the carbon nanotube structure and the first reacting material.

Another method for introducing the at least two types of reacting materials into the carbon nanotube structure includes (2b1) forming a first reacting material layer on the surface of the carbon nanotube structure and (2b2) forming a second reacting material layer on the surface of the first reacting material layer. The total thickness of the first and the second reacting material layers is about 1 nm to about 100 nm. In one embodiment, the first reacting material layer is a metal layer, for example, an Al and Ti layer, and the second reacting material layer is a silicon layer. In one embodiment, the first and the second reacting layer are metal layers, for example, an Al and Ti layer or an Al and Ni layer.

Yet another method for introducing the at least two types reacting materials into the carbon nanotube structure includes simultaneously introducing two gaseous reacting materials, two liquid reacting materials, or a combination of one gaseous reacting material and one liquid reacting material.

In one embodiment, a Ti layer is deposited on the surface of the carbon nanotube structure by a magnetron sputtering method. The carbon nanotube structure with the Ti layer is exposed to the atmosphere, thus creating a sufficient contact between the Ti particles on the surface of the carbon nanotube structure and the oxygen gas in the atmosphere. When the thickness of the Ti layer reaches about 1 nm to about 100 nm, a plurality of successive titanium dioxide ($TiO_2$) nanoparticles is formed after the reaction of the Ti layer and the oxygen gas. When the thickness of the Ti layer is less than 100 nm, a plurality of spaced $TiO_2$ particles can be formed.

Method For Step 3

In step (3), the reacting materials are activated to grow nanoparticles. The methods of activating the reacting materials can be by heating, laser scanning, reactive sputtering and any combination thereof. The gas containing a silicon source and a carbon source is activated to grow silicon carbide nanoparticles by the heating method. The metal and oxygen gas are activated to grow metallic oxide nanoparticles by the laser irradiating method. Vacuum sputtering of metal particles and oxygen gas grows metal oxide nanoparticles.

In one embodiment, the laser scanning is used to render the reacting materials to react. When the total surface of the carbon nanotube structure is scanned via the laser scanning method, the reacting materials on the surface of the carbon nanotube structure can be reacted. When a part of the surface of the carbon nanotube structure is scanned via the laser scanning method, the reacting materials on the surface of the carbon nanotube structure diffuse along the arrangement of the carbon nanotubes from the position where the laser is scanned.

When the part of the surface of the carbon nanotube structure is scanned, the carbon nanotube structure can be arranged on a substrate. The larger the heat transfer coefficient, the faster the heat transfer toward the substrate and the slower the growth speed of the carbon nanotube structure. If the carbon nanotube structure is suspended on the frame, the carbon nanotube structure has the fastest heat transfer because of a small coefficient of the air.

Nanoparticles 104 are coated on the surface of the carbon nanotube structure and grow along the length direction of the carbon nanotubes of the carbon nanotube structure. The carbon nanotube composite material 10 is free-standing because the carbon nanotube structure utilized as the template is free-standing.

Figure 11:
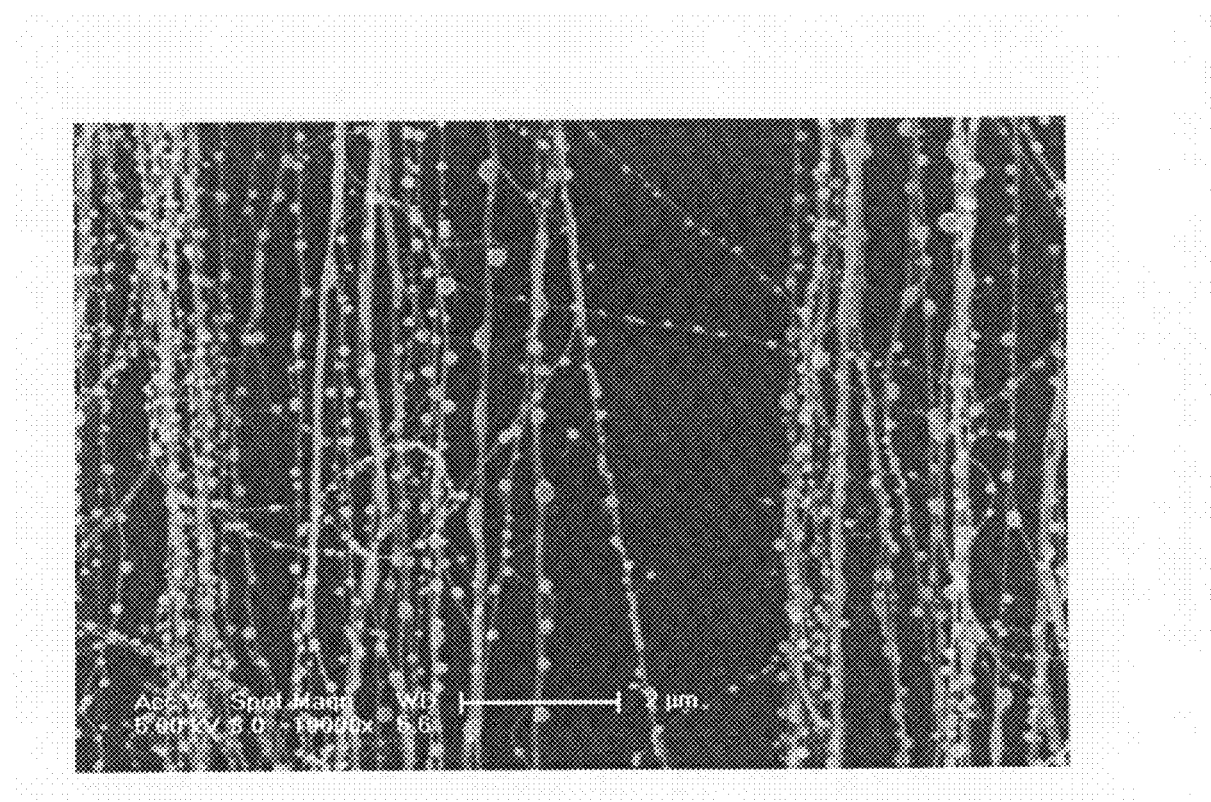
FIG. 11 is an SEM image of a composite material formed by activating a first reacting material layer.
Figure 12:
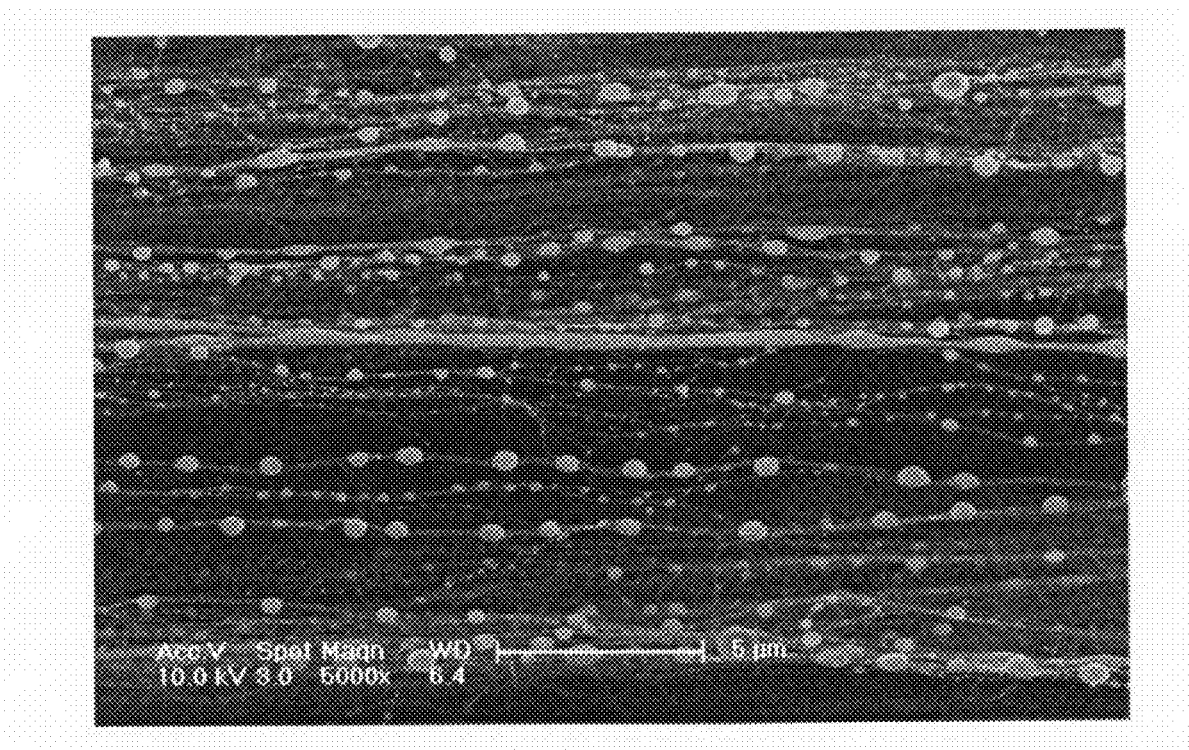
FIG. 12 is an SEM image of composite material formed by activating a second reacting material layer.
Figure 13:
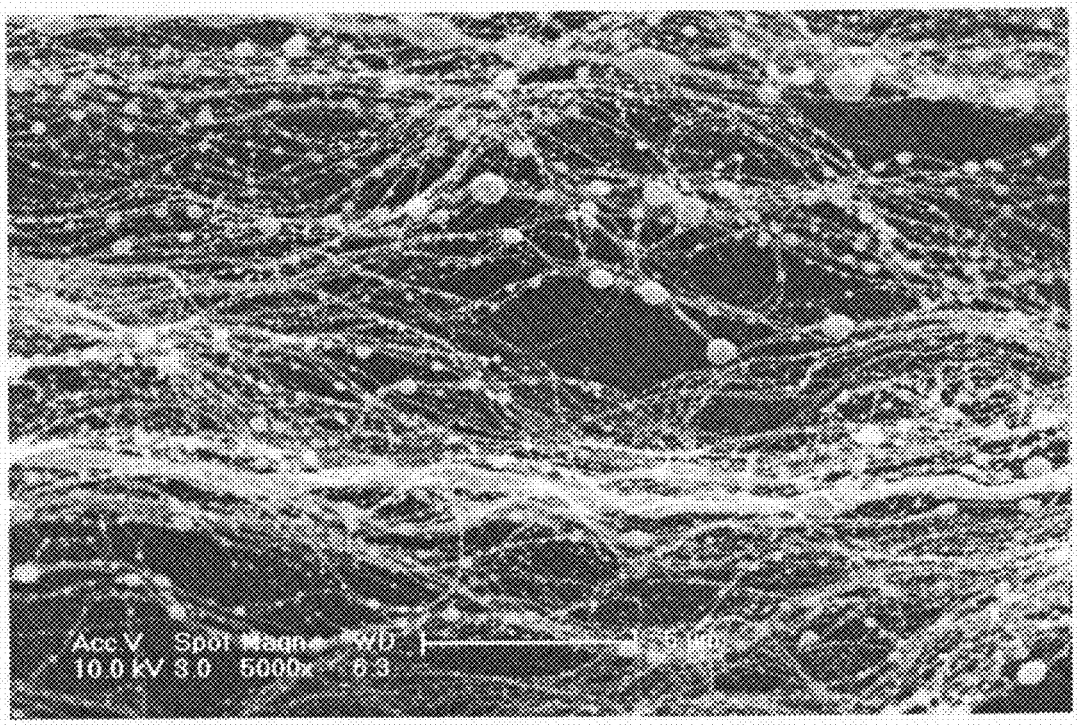
FIG. 13 is an SEM image of a composite material formed by activating a third reacting material layer.
Figure 14:
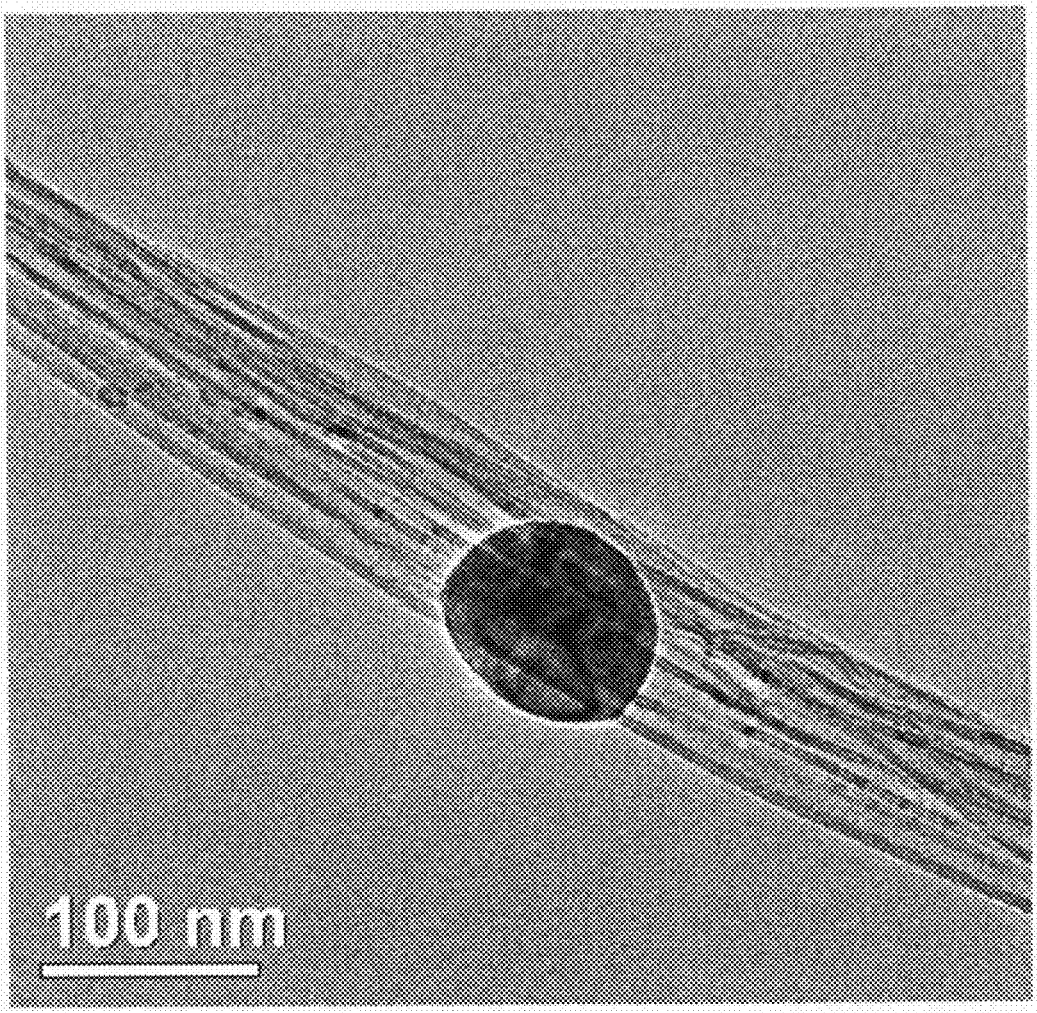
FIG. 14 is a Transmission Electron Microscopy (TEM) image of the composite material of FIG. 11.

Referring to FIGS. 11 to 13, the carbon nanotube composite material 10 have three different sizes of $TiO_2$ nanoparticles formed by activating three different thicknesses, 10 nm, 20 nm, 50 nm of the reacting material layer. The carbon nanotube composite material 10 includes a carbon nanotube structure 100 and a plurality of uniformly distributed $TiO_2$ nanoparticles. The size distribution of the $TiO_2$ nanoparticles diameter change with the Ti layer thickness. If the layer thickness is sufficiently small, the size of the nanoparticles diameter are more uniformly distributed. Referring to FIG. 14, a TEM image of the carbon nanotube composite material 10 of FIG. 11, a plurality of carbon nanotubes are embedded in one $TiO_2$ nanoparticle.

The method of introducing reacting materials into the carbon nanotube structure 100 and activating the reacting materials to grow the carbon nanotube composite material 10 is thus easy, low cost, and is suitable for mass production.

Finally, it is to be understood that the embodiments described are intended to illustrate rather than limit the present disclosure. Variations may be made to the embodiments without departing from the spirit of the present disclosure as claimed. The embodiments illustrate the scope of the present disclosure but do not restrict the scope of the invention.

What is claimed is:

1. A method for fabricating a composite material, the method comprising:
   providing a free-standing carbon nanotube structure comprising a plurality of aligned carbon nanotubes;
   introducing a first reacting material layer on a surface of each of the plurality of aligned carbon nanotubes of the carbon nanotube structure;
   introducing a second reacting material layer on a surface of the first material layer;
   activating the at least two reacting materials to form a plurality of nanoparticles; and
   coating the nanoparticles on a surface of each of the plurality of aligned carbon nanotubes of the carbon nanotube structure.

2. The method for fabricating a composite material as claimed in claim 1, wherein a thickness of the reacting material layer ranges from about 1 nanometer to about 100 nanometers.

3. The method for fabricating a composite material as claimed in claim 1, wherein the first reacting material layer is a metal layer, and the second reacting material layer is a silicon layer.

4. The method for fabricating a composite material as claimed in claim 3, wherein the metal layer is sputtered on the surface of the carbon nanotube structure by a method of physical vapor deposition.

5. The method for fabricating a composite material as claimed in claim 3, the silicon layer is formed on the surface of the carbon nanotube structure by a method of chemical vapor deposition.

6. The method for fabricating a composite material as claimed in claim 1, wherein the first reacting material layer and the second reacting material layer are metal layers.

7. The method for fabricating a composite material as claimed in claim 1, wherein a thickness of the first reacting material layer ranges from about 1 nanometer to about 100 nanometers, and the method of introducing the at least two reacting materials into the carbon nanotube structure further comprises introducing a second gas or liquid reacting material to the carbon nanotube structure.

8. The method for fabricating a composite material as claimed in claim 7, wherein the first reacting material layer is a silicon layer.

9. The method for fabricating a composite material as claimed in claim 7, wherein the first reacting material layer is a metal layer selected from the group consisting of titanium, aluminum, and nickel layer.

10. The method for fabricating a composite material as claimed in claim 7, wherein the second gas reacting material is selected from the group consisting of oxygen gas, nitrogen gas, silicon source gas, and carbon source gas.

11. The method for fabricating a composite material as claimed in claim 10, wherein the oxygen gas is activated to grow metallic oxide nanoparticles by a laser irradiating method.

12. The method for fabricating a composite material as claimed in claim 7, wherein the second liquid reacting material is selected from the group consisting of methyl alcohol, ethanol, acetone, and liquid colophony.

13. The method for fabricating a composite material as claimed in claim 1, wherein the method for forming the reacting layer is selected from the group consisting of chemical vapor deposition, physical vapor deposition, impregnation method, spraying method, and silk-screen printing method.

14. The method for fabricating a composite material as claimed in claim 1, wherein a method for activating the at least two reaction materials is selected from the group consisting of heating, laser scanning, reactive sputtering, and any combination thereof 15. The method for fabricating a composite material as claimed in claim 1, wherein the method of introducing the at least two reacting materials into the carbon nanotube structure comprises simultaneously introducing two gaseous reacting materials, two liquid reacting materials, or a combination of one gaseous reacting material and one liquid reacting material.

16. The method for fabricating a composite material as claimed in claim 1, wherein the nanoparticles grows along a lengthwise direction of the carbon nanotubes in the carbon nanotube structure.

17. The method for fabricating a composite material as claimed in claim 16, wherein a distance between the two adjacent nanoparticles is larger than any diameter of the nanoparticles, wherein the diameters of the nanoparticles are in a range of about 1 nanometer to about 100 nanometers.

18. A method for fabricating a composite material, the method comprising:

providing a carbon nanotube structure comprising a plurality of carbon nanotubes, wherein the plurality of carbon nanotubes are adhered to each other such that the carbon nanotube structure is a free-standing structure;

introducing a first reacting material layer on a surface of each of the carbon nanotubes of the carbon nanotube structure;

introducing a second reacting material layer on a surface of the first material layer; and activating the at least two reacting materials to grow a plurality of nanoparticles directly on a surface of each of the carbon nanotubes of the carbon nanotube structure, and the plurality of nanoparticles are spaced from each other.

19. The method for fabricating a composite material as claimed in claim 18, wherein at least one of the plurality of carbon nanotubes is embedded in one of the plurality of nanoparticles.

20. A method for fabricating a composite material, the method comprising:

providing a carbon nanotube structure comprising a plurality of carbon nanotubes, wherein the plurality of carbon nanotubes are adhered to each other such that the carbon nanotube structure is a free-standing structure;

introducing at least two reacting materials into the carbon nanotube structure; and growing a plurality of nanoparticles on the plurality of carbon nanotubes of the carbon nanotube structure, and at least one of the plurality of carbon nanotubes is embedded in one of the plurality of nanoparticles.

* * * * *